(12) United States Patent
Kondou

(10) Patent No.: US 7,529,961 B2
(45) Date of Patent: May 5, 2009

(54) SEMICONDUCTOR DEVICE WITH CLOCK FAILURE DETECTION CIRCUITRY

(75) Inventor: Takao Kondou, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 511 days.

(21) Appl. No.: 11/302,177

(22) Filed: Dec. 14, 2005

(65) Prior Publication Data
US 2006/0149983 A1 Jul. 6, 2006

(30) Foreign Application Priority Data
Dec. 16, 2004 (JP) ............................. 2004-364771

(51) Int. Cl.
*G06F 1/14* (2006.01)
(52) U.S. Cl. ................... 713/502; 713/500; 714/48
(58) Field of Classification Search ................. 713/500, 713/502, 503; 714/34, 48, 55, 704, 706
See application file for complete search history.

(56) References Cited

U.S. PATENT DOCUMENTS

| 5,787,095 | A | * | 7/1998 | Myers et al. ................. 714/820 |
| 5,946,362 | A | * | 8/1999 | Ha ............................. 375/357 |
| 7,154,305 | B2 | * | 12/2006 | Driediger et al. .............. 327/47 |
| 2004/0263267 | A1 | * | 12/2004 | Yin et al. ...................... 331/74 |

FOREIGN PATENT DOCUMENTS

JP 7-006155 1/1995

* cited by examiner

*Primary Examiner*—Thomas Lee
*Assistant Examiner*—Paul B Yanchus, III
(74) *Attorney, Agent, or Firm*—Foley & Lardner LLP

(57) ABSTRACT

A semiconductor device is composed of an oscillator circuit developing a clock, and an oscillation failure detect unit. The an oscillation failure detect unit is configured to obtain at least one count value through counting clock pulses of the clock, and to activate an oscillation failure detect signal in response to the at least one count value being out of a predetermined count value range.

15 Claims, 6 Drawing Sheets

Fig. 2

| CAUSES OF FAILURES | OSCILLATOR CIRCUIT OUTPUT |
|---|---|
| SHORT BETWEEN FIRST AND SECOND INPUT TERMINALS OF OSCILLATOR CIRCUIT | FIXED TO VDD OR GND LEVEL |
| SHORT BETWEEN EARTH TERMINAL AND FIRST INPUT TERMINAL OF OSCILLATOR CIRCUIT | FIXED TO GND LEVEL |
| SHORT BETWEEN EARTH TERMINAL AND SECOND INPUT TERMINAL OF OSCILLATOR CIRCUIT | FIXED TO VDD LEVEL |
| INCOMPLETE SHORT BETWEEN EARTH TERMINAL AND FIRST INPUT TERMINAL OF OSCILLATOR CIRCUIT | OSCILLATE AT NORMAL FREQUENCY OR FIXED TO GND LEVEL |
| INCOMPLETE SHORT BETWEEN EARTH TERMINAL AND SECOND INPUT TERMINAL OF OSCILLATOR CIRCUIT | OSCILLATE AT NORMAL FREQUENCY OR FIXED TO VDD LEVEL |
| SHORT BETWEEN POWER SUPPLY TERMINAL AND FIRST INPUT TERMINAL OF OSCILLATOR CIRCUIT | FIXED TO VDD LEVEL |
| SHORT BETWEEN POWER SUPPLY TERMINAL AND SECOND INPUT TERMINAL OF OSCILLATOR CIRCUIT | FIXED TO GND LEVEL |
| INCOMPLETE SHORT BETWEEN POWER SUPPLY TERMINAL AND FIRST INPUT TERMINAL OF OSCILLATOR CIRCUIT | OSCILLATE AT NORMAL FREQUENCY OR FIXED TO VDD LEVEL |
| INCOMPLETE SHORT BETWEEN POWER SUPPLY TERMINAL AND SECOND INPUT TERMINAL OF OSCILLATOR CIRCUIT | OSCILLATE AT NORMAL FREQUENCY OR FIXED TO GND LEVEL |
| OPEN FAILURES AT FIRST AND SECOND INPUT TERMINALS OF OSCILLATOR CIRCUIT | FIXED TO VDD OR GND LEVEL |
| OPEN FAILURE AT FIRST INPUT TERMINAL OF OSCILLATOR CIRCUIT | FIXED TO VDD OR GND LEVEL |
| OPEN FAILURE AT SECOND INPUT TERMINAL OF OSCILLATOR CIRCUIT | FIXED TO VDD OR GND LEVEL |
| SHORT BETWEEN FIRST AND SECOND INPUT TERMINALS OF OSCILLATOR CIRCUIT THROUGH PARASITIC INDUCTANCE L | UNSTABLY OSCILLATE |

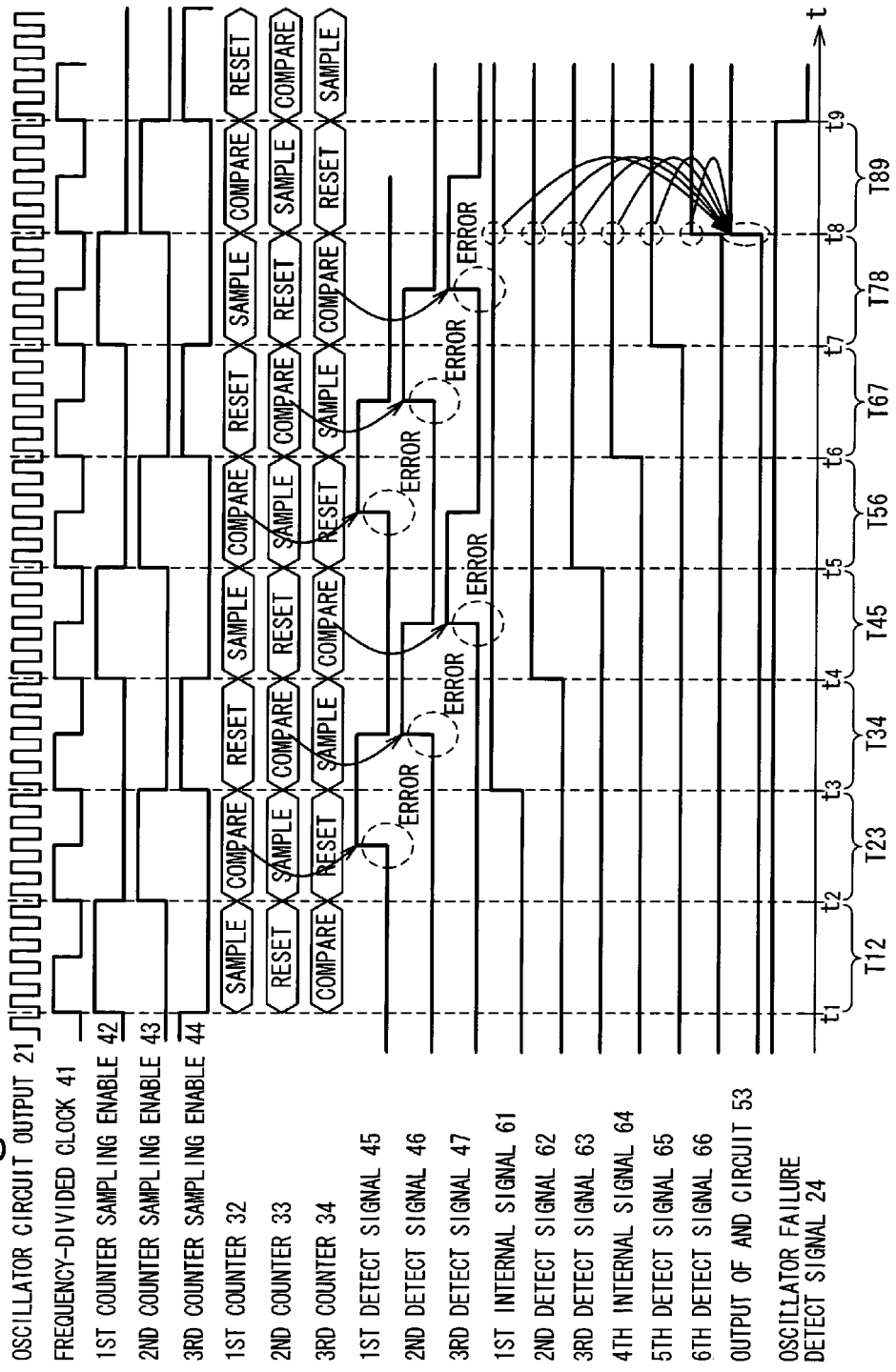

SEMICONDUCTOR DEVICE WITH CLOCK FAILURE DETECTION CIRCUITRY

BACKGROUND OF THE INVENTION

1. Field of the Invention

The present invention relates to a semiconductor device, in particular, relates to clock failure detection within a semiconductor device.

2. Description of the Related Art

Recently, single-chip microcomputers, within which a CPU (central processing unit) and other circuits, such as memories, are monolithically integrated, are widely used. A single-chip microcomputer incorporates an oscillator circuit for developing a system clock of a desired frequency. Other circuits within the single-chip microcomputer are designed to operate in synchronization with the system clock. When the frequency of the clock is in a specific frequency range defined by the specifications, the single-chip microcomputer operates normally. However, the single-chip microcomputer may malfunction if the frequency of the clock generated by the oscillator circuit is out of the specific range.

Japanese Laid Open Patent Application JP-A-Heisei 07-6155 discloses a technique for avoiding malfunctions of a single-chip microcomputer by detecting fail of an oscillator circuit incorporated therein. FIG. 1 illustrates a block diagram illustrating a configuration of a clock generator circuit disclosed by this document. A clock generator circuit 101 supplies a system clock to a CPU (not shown) and peripheral devices (not shown) within a microcomputer 100. As shown in FIG. 1, the clock generator circuit 101 is configured with a sub-clock oscillator circuit 102, a main clock oscillator circuit 103, a timer 104, an OR circuit 105, a clock switch flag register 106, an oscillation control flag register 107, a timer reset flag register 108, and a system clock switching circuit 109. The registers 106 to 108 are connected to an internal bus 121.

In the clock generator circuit 101, the timer 104 receives a sub-clock signal 111 developed the sub-clock oscillator circuit 102 on the clock signal input, and the OR circuit 105 receives a timer carry signal 116 outputted from the timer 104 and a system reset signal 113 outputted from a reset control circuit to develop a flag reset signal 117. The flag reset signal 117 is the logical OR of the timer carry signal 116 and the system reset signal 113. The system clock switching circuit 109 generates the system clock signal in response to the output of the main clock oscillator circuit 103.

When a failure occurs in the main clock oscillator circuit 103, the generation of a main clock signal is stopped, and therefore the clock generator circuit 101 stops supplying the system clock signal to the CPU within the microcomputer 100. Consequently, the CPU stops operating. The conventional microcomputer 100 detects the failure in the main clock oscillator circuit 103 on the basis of the fact that the operation of the CPU is stopped. When detecting the failure of the main clock oscillator circuit 103, the conventional clock generator circuit 101 automatically switches the clock oscillator circuits 102 and 103 to generate that the system clock signal using the output of the sub-clock oscillator circuit 102. As a result, the operation of the microcomputer 100 is maintained.

As shown in FIG. 1, the clock generator circuit 101 is provided with input terminals 131 to 134 to be connected to externally-provided oscillators. The system clock is generated to have a natural frequency of the oscillators. The generated system clock is supplied to the CPU, the memory, and peripheral circuits of the microcomputer 100. In other words, the oscillator circuit generates the clock having the constant frequency mentioned above, in response to the signal supplied from the input terminal.

One issue is that application of an external force to the single-chip microcomputer may cause deformation of the input terminals 131 to 134, and thereby cause short-circuiting or incomplete short circuiting. Also, in the case where the microcomputer 100 is mounted on a substrate, short-circuiting or incomplete short-circuiting may be caused by poor contacting with the substrate. Short failures are often caused by physical factors, and it is therefore extremely difficult to avoid short failures related to the input terminals.

If any two of the input terminals are short-circuited, the frequency of the system clock generated by the clock generator circuit 101 may be out of the allowed frequency range. This may cause runaway of the CPU within the single-chip microcomputer, read and/or write errors of the memory, and other undesirable improper operations.

FIG. 2 is a table showing causes of the failures, and the statuses of the resultant outputs of the clock generator circuit. The causes of the failures are listed on the left column, and the statuses of the resultant outputs are listed on the right column.

As shown in FIG. 2, short-circuiting (or incomplete short-circuiting) at the input terminals of the clock generator circuit may result in that the clock generator circuit does not develop a clock signal of a desired frequency; the output of the clock generator circuit may be fixed to the power supply potential VDD or the earth potential GND.

With reference to the bottom row of the table, one failure mode that the inventor has discovered is that the clock generator circuit oscillates unstably and the output thereof undesirably includes high frequency components in the frequency range above the frequency of the clock signal normally developed by the clock generator circuit, when two of the input terminals are short-circuited through a parasitic inductive element.

In the conventional system, consideration is not given to the fact that a clock signal containing high-frequency components may be outputted from the oscillator circuit. With the above conventional technique, therefore, it is difficult to deal with such failure mode in which a clock signal containing high-frequency components is generated. This problem is desirably solved immediately.

SUMMARY OF THE INVENTION

In an aspect of the present invention, a semiconductor device is composed of an oscillator circuit developing a clock, and an oscillation failure detect unit. The an oscillation failure detect unit is configured to obtain at least one count value through counting clock pulses of the clock, and to activate an oscillation failure detect signal in response to the count value(s) being out of a predetermined count value range.

The semiconductor device thus constructed can detect the fact that the clock developed by the oscillator circuit includes high-frequency components. This effectively improves the reliability of the semiconductor device.

BRIEF DESCRIPTION OF THE DRAWINGS

The above and other advantages and features of the present invention will be more apparent from the following description taken in conjunction with the accompanied drawings, in which:

FIG. 2 is a table showing causes of failure and the resultant output of an oscillator circuit;

FIG. 6 is a timing chart showing operation of the single-chip microcomputer in this embodiment.

DESCRIPTION OF THE PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Device Configuration

Figure 1:
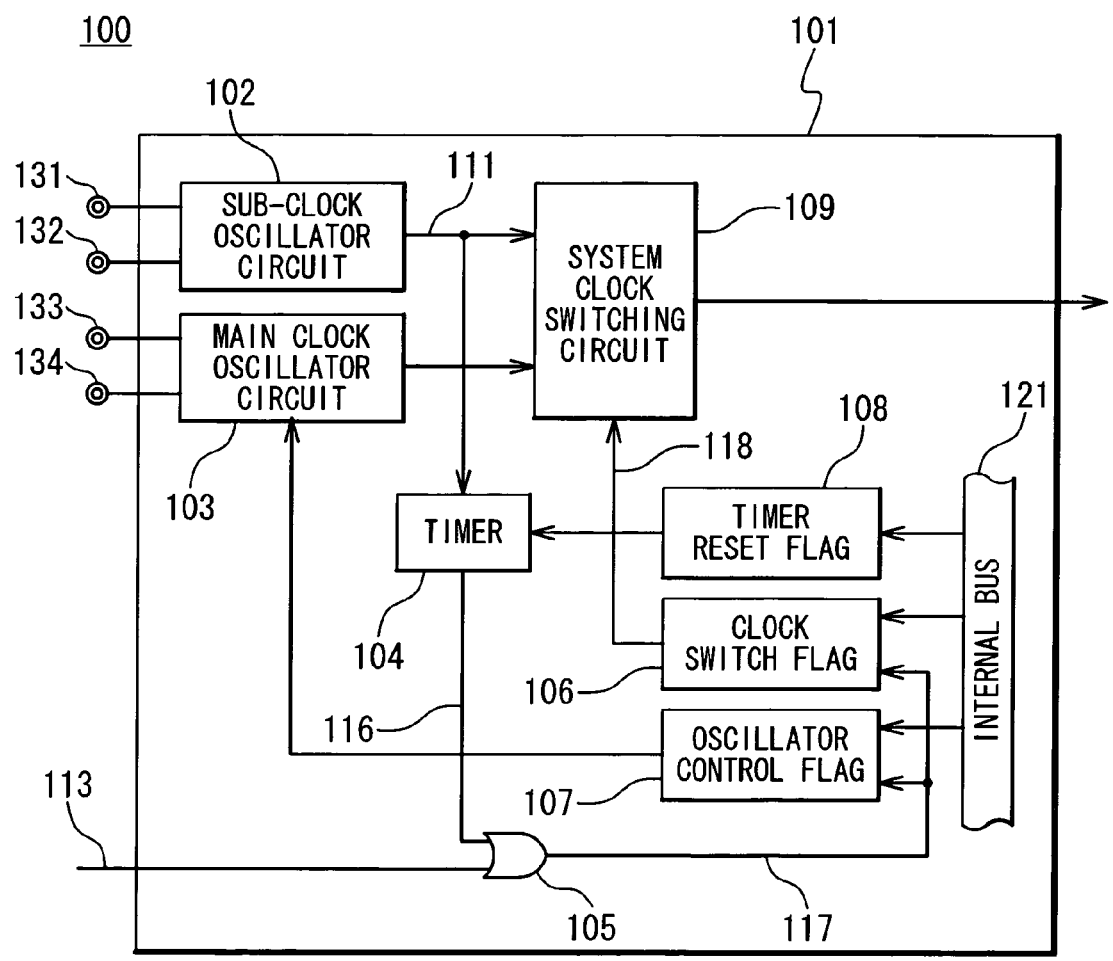
FIG. 1 is a block diagram showing a configuration of a conventional clock generator circuit.
Figure 3:
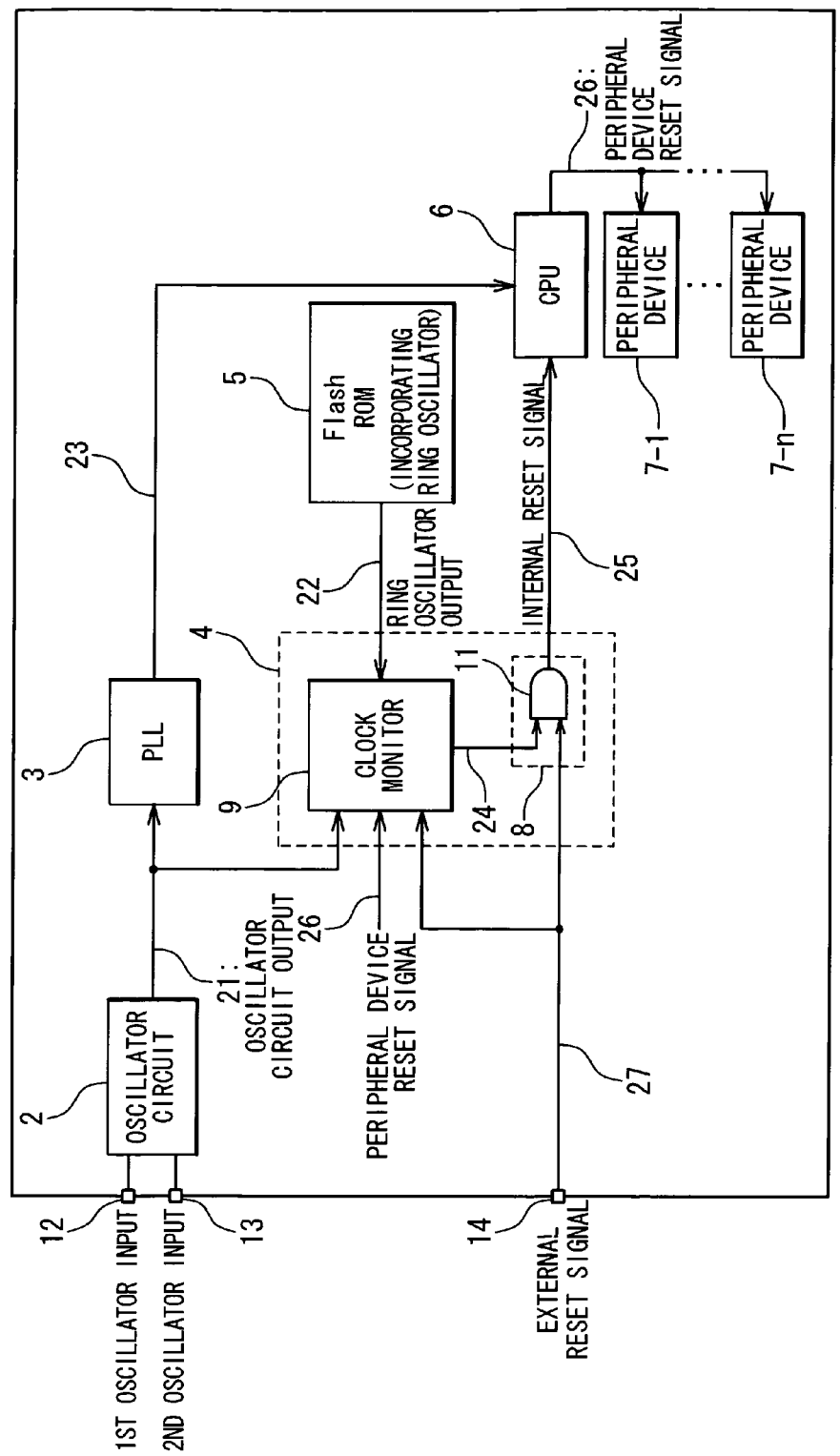
FIG. 3 is a circuit diagram showing a configuration of a single-chip microcomputer in one embodiment of the present invention.

FIG. 3 is a circuit diagram illustrating a configuration of a semiconductor device in one embodiment of the present invention. In this embodiment, description is given with an assumption that the semiconductor device is a single-chip microcomputer; however, it should not be understood that the present invention is applicable only to a single-chip microcomputer.

With reference to FIG. 3, a single-chip microcomputer 1 in this embodiment is composed of an oscillator circuit 2, a PLL (Phase Locked Loop) 3, an oscillation failure detect unit 4, a Flash ROM 5, a CPU (Central Processing Unit) 6, and a plurality of peripheral devices 7-1 to 7-n, n being a natural number.

As shown in FIG. 3, the single-chip microcomputer 1 is provided with first and second oscillator terminals 12 and 13 connected to the oscillator circuit 2. The first and second oscillator terminals 12 and 13 are connected with an external oscillator, such as a quartz oscillator, to develop a clock (oscillator circuit output 21) of a frequency corresponding to a natural frequency of the connected oscillator. The clock is supplied to the PLL 3, and the output of the PLL 3 (PLL output 23) is connected to the CPU 6, a memory (not shown), and the peripheral circuits 7-1 to 7-n. Additionally, the single-chip microcomputer 1 has an external reset signal input terminal 14 connected to the oscillation failure detect unit 4.

The oscillator circuit 2 generates a clock having a constant frequency using the external oscillator connected with the first and second oscillator terminals 12 and 13. In one embodiment, a Colpitts oscillator circuit may be used as the oscillator circuit 2. The PLL 3 develops a clock signal synchronous with the oscillator circuit output 21, which is referred to as a PLL output 23, hereinafter. Specifically, the PLL 3 detects a phase difference between the oscillator-circuit output 21 and the PLL output 23, and controls a feedback loop containing a voltage controllable oscillator (not shown) to achieve the synchronization of the PLL output 23 with the oscillator circuit output 21. The PLL output 23 is fed to the CPU 6.

The oscillation failure detect unit 4 monitors whether the oscillator circuit output 21, developed by the oscillator circuit 2, has a frequency in a desired frequency range. The oscillation failure detect unit 4 develops an internal reset signal 25 in response to the oscillator circuit output 21.

The Flash ROM 5, which includes floating-gate memory cells, stores various system data, such as BIOS, in a non-volatile manner. The Flash ROM 5 incorporates a ring oscillator circuit for supplying a clock signal to a charge pump within a booster circuit which develops a high supply voltage. The Flash ROM 5 supplies the oscillation failure detect unit 4 with the clock signal developed by the ring oscillator circuit, which is referred to as the ring oscillator output 22.

The CPU 6 carries out control operation of the single-chip microcomputer 1. The CPU 6 interprets and calculates data received from the outside of the single-chip microcomputer 1, and controls desired devices (for example, the peripheral devices 7-1 to 7-n) in response to the results of the calculation. The CPU 6 generates a peripheral device reset signal 26 in response to the internal reset signal 25, and supplies the generated peripheral device reset signal 26 to the plurality of the peripheral devices 7-1 to 7-n.

The oscillation failure detect unit 4 is composed of a clock monitor 9 and an internal reset signal generator circuit 8. The clock monitor 9 monitors the oscillation circuit output 21 received from the oscillator circuit 2 to develop an oscillation failure detect signal 24. The clock monitor 9 operates only while the external reset signal 27 is deactivated.

The internal reset signal generator circuit 8 generates the internal reset signal 25 in response to the oscillation failure detect signal 24 and the external reset signal 27, which is received from the external reset signal input terminal 14. As shown in FIG. 3, the internal reset signal generator circuit 8 is provided with a signal generating unit 11, and carries out logical operation in response to the oscillation failure detect signal 24 and the external reset signal 27 to generate the internal reset signal 25. The signal generating unit 11 may include a power-on clear circuit (not shown) and a watchdog timer (not shown). In one embodiment, the signal generating unit 11 may be configured to deactivate the internal reset signal 25 in response to a logical AND of all the signals supplied thereto.

With reference to FIG. 3, the oscillator circuit 2 develops the oscillator circuit output 21 in response to first and second oscillator input signal received from the first and second oscillator input terminals 12, and 13. The oscillator circuit output 21 is supplied to the PLL 3 and also to the clock monitor 9. The PLL 3 generates the PLL output 23 which is supplied to the CPU 6 in response to the oscillator circuit output 21. The clock monitor 9 generates the oscillation failure detect signal 24, which is the internal reset signal generator circuit 8, in response to the oscillator circuit output 21, and the ring oscillator output 22 received from the Flash ROM 5. A detailed description of the operation for generating the oscillation failure detect signal 24 is described later.

The internal reset signal 25 developed by the internal reset signal generator circuit 8 is supplied to the CPU 6. The CPU 6 stops the operation in response to the internal reset signal 25. The CPU 6 generates the peripheral device reset signal 26, which is supplied to the plurality of the peripheral devices 7-1 to 7-n, in response to the internal reset signal 25. The plurality of the peripheral devices 7-1 to 7-n stop the operation in response to the peripheral device reset signal 26. In an alternative embodiment, the peripheral devices 7-1 to 7-n may be configured to stop the operation in response to the internal reset signal 25 received from the internal reset signal generator circuit 8.

Figure 4:
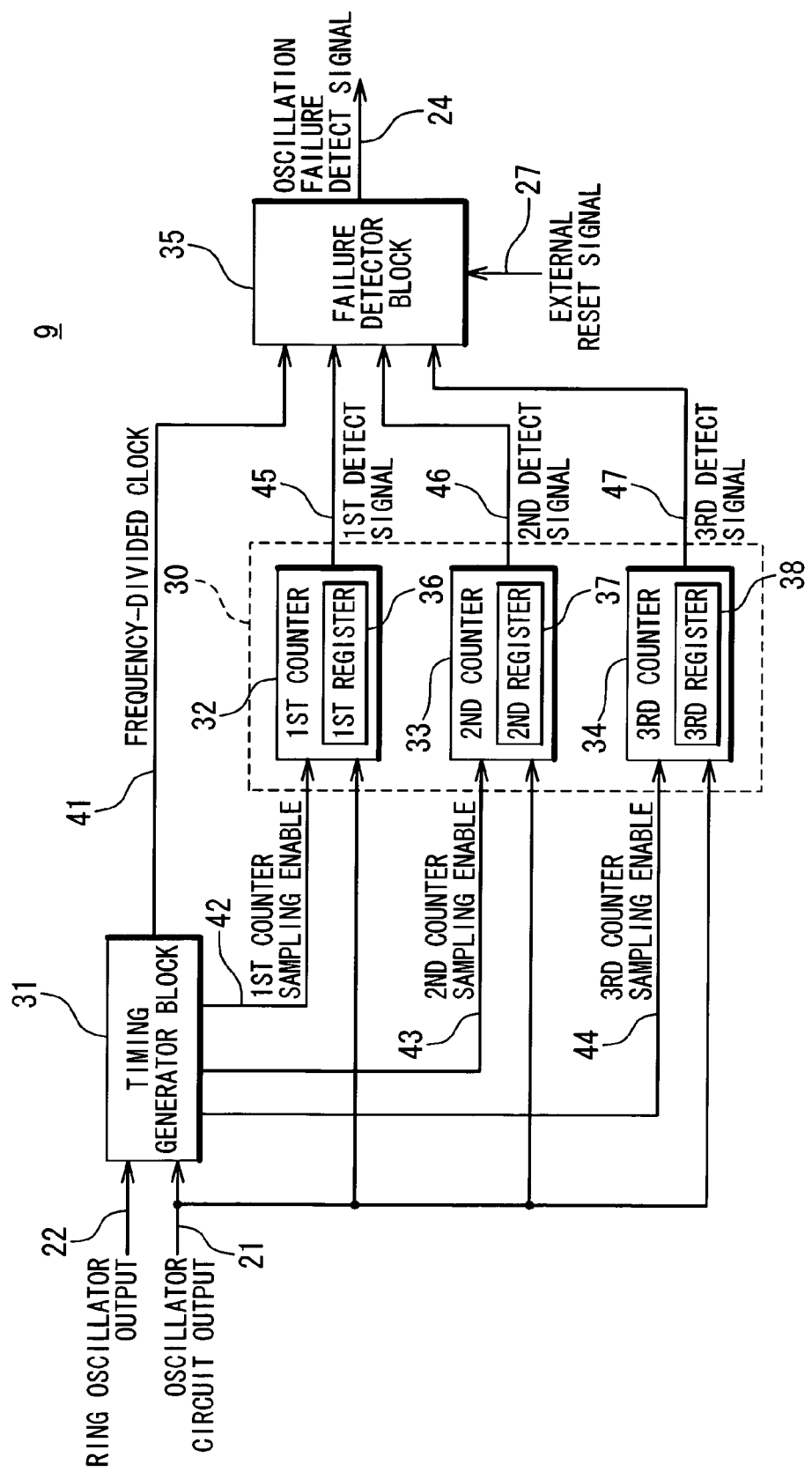
FIG. 4 is a circuit diagram showing a configuration of an oscillation trouble detecting unit.

FIG. 4 is a circuit diagram showing a configuration of the clock monitor 9. The clock monitor 9 is composed of a counter circuitry 30, a timing generator block 31, and a failure detector block 35. The counter circuitry 30 contains first to third counters 32 to 34. The first counter 32 is composed of a first register 36. Similarly, the second and third counters 33 and 34 are composed of second and third registers 37 and 38, respectively.

The timing generator block 31 generates a frequency-divided clock 41 through frequency-dividing of the ring oscillator output 22. Additionally, the timing generator block 31 generates first to third counter sampling enable signals 42 to 44 in response to the oscillator circuit output 21 and the ring oscillator output 22.

The first to third counters 32 to 34 are used for determining a frequency of the oscillator circuit output 21. Specifically, the first counter 32 samples and counts the clock pulses of the oscillator circuit output 21, when the first counter sampling enable signal 42 is activated. The count value contained by the first counter 32 (that is, the number of the clock pulses counted by the first counter 32) is indicative of the frequency of the oscillator circuit output 21. The count value increases as the frequency of the oscillator circuit output 21 increases, and vice versa.

Additionally, the first counter 32 is configured to compare the count value contained therein with upper and lower limit values stored in the register 36, and to detect whether the count value is in a predetermined range defined by the upper and lower limit values. When the count value is out of the predetermined range, the first counter 32 activates the first detect signal 45.

In detail, when the count value is in the predetermined range defined by the upper and lower limit values, this implies that the frequency of the oscillator circuit output 21 is in an allowable frequency range. In this case, the first counter 32 deactivates the first detect signal 45. When the count value is out of the predetermined range, on the contrary, the first counter 32 activates the first detect signal 45 to indicate that the frequency of the oscillator circuit output 21 is out of the allowable frequency range. The first counter 32 supplies the first detect signal 45 to the failure detector block 35.

The first counter 32 is designed to update the upper and lower limit values stored in the register 36 in response to an externally-provided frequency allowable range update command. The allowable frequency range is updatable by updating the upper and lower limit values within the register 36.

The second and third counters 33 and 34 have the same configuration as the first counter 32. The second counter 33 counts the clock pulses of the oscillator circuit output 21 while the second counter sampling enable signal 43 is activated, and generates a second detect signal 46 on the basis of the count value contained therein, and upper and lower limit values contained in the register 37. The third counter 34 counts the clock pulses of the oscillator circuit output 21 while the third counter sampling enable signal 44 is activated, and generates a third detect signal 47 on the basis of the count value contained therein, and upper and lower limit values contained in the register 38.

The failure detector block 35 detects the failure of the oscillator circuit output 21 from the first to third detect signals 45 to 47 in synchronization with the frequency-divided clock 41. The failure detector block 35 generates the oscillation failure detect signal 24 in response to the first to third detect signals 45 to 47. When detecting an oscillation failure, the failure detector block 35 activate the oscillation failure detect signal 24. Additionally, as shown in FIG. 4, the failure detector block 35 deactivate the oscillation failure detect signal 24 in response to the external reset signal 27.

Figure 5:
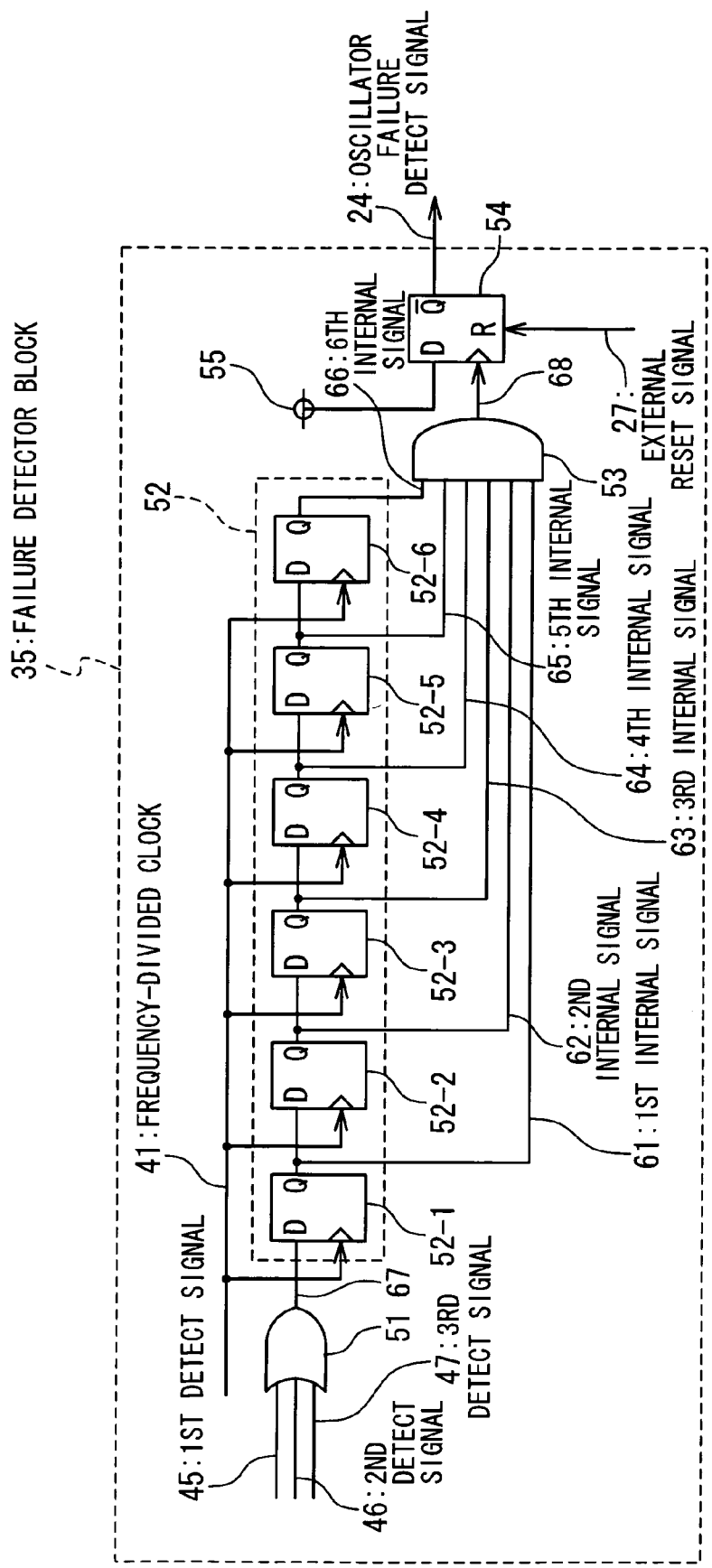
FIG. 5 is a circuit diagram showing a configuration of a failure detector block.

FIG. 5 is a circuit diagram illustrating a configuration of the failure detector block 35. The failure detector block 35 is composed of an OR gate 51, a shift register 52, an AND gate 53, and an output flip-flop 54.

The OR gate 51 generates a logical sum (OR) of the first to third detect signals 45 to 47. In FIG. 5, the output of the OR gate circuit 51 is denoted by the numeral 67.

The shift register 52 stores the states of the oscillator circuit output 21 during a predetermined period. In this embodiment, the shift register 52 stores the states of the oscillator circuit output 21 for the latest six cycles of the frequency-divided clock 41. Specifically, the shift register 52 is composed of serially-connected flip-flops 52-1 to 52-6. The input of the flip-flop 52-1 is connected to the output of the OR gate 51. The flip-flops 52-1 to 52-6 receive the frequency-divided clock 41 on the clock input. The shift register 52 adopts parallel-output structure, and outputs first to sixth internal signals 61 to 66 from the outputs of the flip-flops 52-1 to 52-6. It should be noted that the configuration of the shift register 52 does not limit that shown in FIG. 5.

The AND gate 53 generates a logical product (AND) of the internal signals 61 to 66 received from the outputs of the flip-flops 52-1 to 52-6, respectively. In FIG. 5, the output of the AND gate 63 is denoted by the numeral 68.

The output flip-flop 54 receives the logical product 68 to develop the oscillation failure detect signal 24. The clock input of the output flip-flop 54 is connected to the output of the AND gate 53, and the data input of the output flip-flop 54 is connected to a power supply terminal 55. The oscillation failure detect signal 24 is developed on the inverted output of the output flip-flop 54. The output flip-flop 54 flips to activate the oscillation failure detect signal 24 in response to the logical AND 68 being set to logic "1". The state of the output flip-flop 54 is maintained until the external reset signal 27 is activated. In response to the activation of the external reset signal 27, the output flip-flop 54 is reset, and the oscillation failure detect signal 24 is deactivated.

Device Operation

FIG. 6 is a timing chart showing operations of the semiconductor device in this embodiment. As shown in FIG. 6, the counters 32 to 34 each perform "sampling", "comparison", and "reset" operations, sequentially and repeatedly. More specifically, the counter 32 to 34 count the clock pluses of the oscillator circuit output 21 during "sampling" operations. During "comparison" operations, the counter 32 to 34 compare the count values thereof with the upper and lower limit values, and activate the first to third detect signals in response to the comparison results. Finally, the count values within the counter 32 to 34 are reset during "reset" operations".

It should be noted that any two of the first to third counters 32 to 34 do not perform the same operation in a single clock cycle of the frequency-divided clock 41; in other words, "sampling" operations are cyclically performed by the first to third counters 32 to 34. During a first period T12 between time t1 and time t2, for example, the first counter 32 performs the "sampling" operation, while the second and third counters 33 and 34 perform the "reset" and "comparison" operations, respectively. The same applies to the following periods T23, T34, T45, T56, T67, T78, and T89.

Such operation advantageously achieves continuous monitoring of the oscillation circuit output 21.

It should be noted that the present invention is not limited to the operations mentioned above. In an alternative embodiment, for example, the "sampling" and "comparison and reset" operations may be alternately repeated.

In this embodiment, the oscillation failure detect signal 24 is activated after the frequency failure of the oscillation circuit output 21 is successively detected for multiple clock cycles of the frequency-divided clock 41. In this embodiment, the oscillation failure detect signal 24 is activated after the successive detections of the frequency failure for six clock cycles.

Such operation effectively improves the reliability of the failure detection. In some situations, such as instantaneous fluctuation of the power supply voltage, the frequency of the oscillation circuit output 21 may exhibit fluctuation although the oscillation circuit 2 is free from failure. There are few possibilities that such fluctuation in the oscillation frequency causes malfunctions of the microcomputer 1. The operation in which the oscillation failure detect signal 24 is activated after the successive detections of the frequency failure for multiple clock cycles allows selective detection of significant frequency failure of the oscillation circuit output 21.

Specifically, in the operation shown in FIG. 6, the oscillation failure is successively detected from the second period T23 to the seventh period T78 in this operation. More specifically, at the second period T23, the first counter 32 detects the oscillation failure of the oscillator circuit output 21, and activates the first detect signal 45. Accordingly, the logical sum 67 developed by the OR gate 51 is set to logic "1" in response to the activation of the first detect signal 45. At the beginning of the third period T34, the first flip-flop 52-1 latches the logical sum 67 in synchronization with the frequency-divided clock 41, and flips to logic "1" to activate the first internal signal 61.

At the third period T34, the second counter 33 detects the oscillation failure of the oscillator circuit output 21, and activates the second detect signal 46. Accordingly, the logical sum 67 developed by the OR gate 51 is set to logic "1" in response to the activation of the second detect signal 46. At time t4, (that is, at the beginning of the third period T45), the first flipflop 52-1 latches the logical sum 67 in synchronization with the frequency-divided clock 41, and is set to logic "1" to activate the first internal signal 61. In the meantime, the second flipflop 52-2 latches the output of the first flipflop 52-1 in synchronization with the frequency-divided clock 41, and flips to logic "1" to activate the second internal signal 62.

Correspondingly, all the first to sixth flipflops 52-1 to 52-6 are set to logic "1" when the oscillation failure is then successively detected from the fourth to seventh period T45 to T78, and all the first to sixth internal signals 61 to 66 are activated at time t8 (that is, at the beginning of the eighth period T89).

At time t8, the logical product 68 flips to logic "1", in response to all the first to sixth internal signals 61 to 66 being activated.

At time t9, the output flipflop 54 then flips to logic "1" in response to the logical product 68 being set to logic "1", and the oscillation failure detect signal 24 is activated. It should be noted that the oscillation failure detect signal 24 is low-active, and the oscillation failure detect signal 24 is pull down to the low level at time t9.

In response to the activation of the oscillation failure detect signal 24, the internal reset signal 25 is activated and the CPU 6

The state of the output flipflop 54 is maintained until the external reset signal 27 is activated; the output flipflop 54 continues to activate the oscillation failure detect signal 24, once the oscillation failure is detected.

When the external reset signal 27 is activated, the output flipflop 54 is reset, and the oscillation failure detect signal 24 is deactivated, that is, set to the "high" level. This results in that the internal reset signal 24 is deactivated, and the CPU 6 starts operating. The CPU 6 then deactivates the peripheral device reset signal 26, and allows the peripheral devices 7-1 to 7-n to operate.

In summary, the single-chip microcomputer 1 is designed to detect the oscillation failure of the oscillator circuit output 21, and to stop operation in response to the occurrence of the oscillation failure.

The oscillation failure is detected through counting the clock pulses of the oscillator circuit output 21 and determining whether the number of the clock pulses counted is in an allowed range. The number of the clock pulses counted corresponds to the frequency of the oscillator circuit output 21, and the allowed range corresponds to the allowed frequency range. When the allowed frequency range of the oscillator circuit output 21 is 5 to 7 MHz, for example, the oscillation failure detect unit 4 activates the first to third detect signals 45 to 47 when the frequency of the oscillator circuit output 21 is set to the value out of the allowed frequency range, such as 8 MHz.

Such architecture allows detecting that the oscillator circuit output 21 includes high-frequency components exceeding the allowed frequency range, and stop operating the CPU 6 and other peripheral devices 7-1 to 7-n, accordingly.

Once the oscillation failure is detected, the CPU 6 and the peripheral devices 7-1 to 7-n continue to stop operations until the external reset signal 27 is activated. This inhibits the CPU 6 and the peripheral devices 7-1 to 7-n from being rebooted when statuses of the input terminals of the oscillator circuit 2 are unstable due to the imperfect contact and so forth.

Such architecture is also effective for ensuring that the CPU 6 and the peripheral devices 7-1 to 7-n are rebooted only after the cause of the oscillation failure is completely removed. After the oscillation failure of the oscillator circuit output 21 is detected, the fact that the oscillator circuit output 21 has a frequency in the allowed frequency range may not imply that the cause of the oscillation failure is actually removed. The use of the external reset signal 27 promotes to operate the CPU 6 and the peripheral devices 7-1 to 7-n with the cause of the oscillation failure actually removed, and effectively improves the reliability of the single-chip microcomputer 1.

Furthermore, the single-chip microcomputer 1 in this embodiment is designed to conclude the occurrence of the oscillation failure after the oscillation failure is continuously detected for a predetermined period. This allows ignoring insignificant frequency fluctuation of the oscillator circuit output 21, and effectively improves the reliability of the oscillation failure detection.

It is apparent that the present invention is not limited to the above-described embodiments, which may be modified and changed without departing from the scope of the invention.

What is claimed is:

1. A semiconductor device comprising:
   an oscillator circuit developing a clock;
   an oscillation failure detect unit configured to obtain at least one count value through counting clock pulses of said clock, and to activate an oscillation failure detect signal in response to said at least one count value being out of a predetermined count value range,
   wherein said at least one count value includes:
      a first count value obtained through counting clock pulses of said clock developed by said oscillator circuit during a first period, and
      a second count value obtained through counting clock pulses of said clock developed by said oscillator circuit during a second period, and
   wherein said oscillation failure detect unit activates an oscillation failure detect signal in response to both of said first and second count values being out of said predetermined count value range.

2. The semiconductor device according to claim 1, further comprising:
a CPU configured to stop operating in response to activation of said oscillation failure detect signal.

3. The semiconductor device according to claim 1, wherein said oscillation failure detect unit includes a clock monitor comprising:
a first counter counting clock pulses of said clock during said first period to obtain said first count value, and developing a first detect signal indicative of whether said first count value is in said predetermined range,
a second counter counting clock pulses of said clock during said second period to obtain said second count value, and developing a second detect signal indicative of whether said second count value is in said predetermined range, and
a failure detector circuit developing said oscillation failure detect signal in response to said first and second detect signal.

4. The semiconductor device according to claim 1, wherein said oscillation failure detector unit includes an oscillation failure detect signal hold circuit holding a value of said oscillation failure detect signal to continuously activate said oscillation failure detect signal.

5. The semiconductor device according to claim 3, wherein at least one of said first and second counters includes a memory device containing upper and lower limit values defining said predetermined count value range.

6. The semiconductor device according to claim 3, wherein said clock monitor further includes a timing generator circuit developing first and second count enable signals, and
wherein said first counter is enabled to count clock pulses of said clock when said first count enable signal is activated, and
wherein said second counter is enabled to count clock pulses of said clock when said second count enable signal is activated.

7. The semiconductor device according to claim 6, wherein said timing generator circuit feeds a failure detecting clock to said failure detector circuit, and
wherein said failure detector circuit comprises:
an oscillation failure detect signal hold circuit holding a value of said oscillation failure detect signal to continuously activate said oscillation failure detect signal;
a first logic gate performing a logical operation on said first and second detect signals to develop a resultant detect signal;
a serial-input and parallel-output shift register receiving said resultant detect signal on an input thereof and developing a set of internal signals on outputs thereof, and
a second logic gate performing a logical operation on said internal signals, an output thereof being connected with said oscillation failure detect signal hold circuit.

8. The semiconductor device according to claim 6, further comprising:
a floating gate non-volatile memory including a ring oscillator circuit feeding a clock signal to a charge pump within a booster circuit, and
said timing generator circuit develops said failure detecting clock from said clock signal developed by said ring oscillator circuit.

9. The semiconductor device according to claim 4, wherein said oscillation failure detect signal hold circuit is responsive to a reset signal for deactivating said oscillation failure detect signal.

10. The semiconductor device according to claim 5, wherein said memory device is designed to update said upper and lower limit values stored therein in response to an externally-provided frequency allowable range update command.

11. A semiconductor device comprising:
an oscillator circuit developing a clock;
a CPU;
a first counter counting clock pulses of said clock during a first period to obtain a first count value;
a second counter counting clock pulses of said clock during a second period following said first period to obtain a second count value;
a third counter counting clock pulses of said clock during a third period following said second period to obtain a third count value; and
a failure detector circuit developing an oscillation failure detect signal;
wherein said first counter activates a first detect signal at said second period when said first count value is out of a predetermined count value range, and resets said first count value at said third period,
wherein said second counter activates a second detect signal at said third period when said second count value is out of said predetermined count value range, and resets said second count value at a fourth period following said third period,
wherein said third counter activates a third detect signal at said fourth period when said third count value is out of said predetermined count value range, and resets said third count value at a fifth period following said fourth period,
wherein said failure detector circuit activates said oscillation failure detect signal in response to said first to third detect signals being activated, and
wherein said CPU stops operation in response to said oscillation failure detect signal being activated.

12. The semiconductor device according to claim 11, wherein said failure detector circuit includes an oscillation failure detect signal hold circuit holding a value of said oscillation failure detect signal to continuously activate said oscillation failure detect signal.

13. The semiconductor device according to claim 11, wherein said first to third counters includes a memory device containing upper and lower limit values defining said predetermined count value range.

14. The semiconductor device according to claim 12, further comprising:
a floating gate non-volatile memory including a ring oscillator circuit feeding a clock signal to a charge pump within a booster circuit; and
a timing generator circuit developing a failure detecting clock signal from said clock signal developed by said ring oscillator,
wherein said failure detector circuit includes:
a first logic gate performing a logical operation on said first to third detect signals to develop a resultant detect signal;
a serial-input and parallel-output shift register receiving said resultant detect signal on an input thereof and developing a set of internal signals on outputs thereof, and
a second logic gate performing a logical operation on said internal signals, an output thereof being connected with said oscillation failure detect signal hold circuit.

15. The semiconductor device according to claim 11, wherein said oscillator circuit, said CPU, said first to third counter, and said failure detector circuit are monolithically integrated.

* * * * *